No. 660,461. Patented Oct. 23, 1900.
F. P. ROSBACK.
MACHINE FOR CUTTING LOZENGES.
(Application filed Dec. 5, 1898.)

(No Model.) 6 Sheets—Sheet 1.

Witnesses: Inventor:
Frederick P. Rosback,
By Banning & Banning & Sheridan,
Att'ys

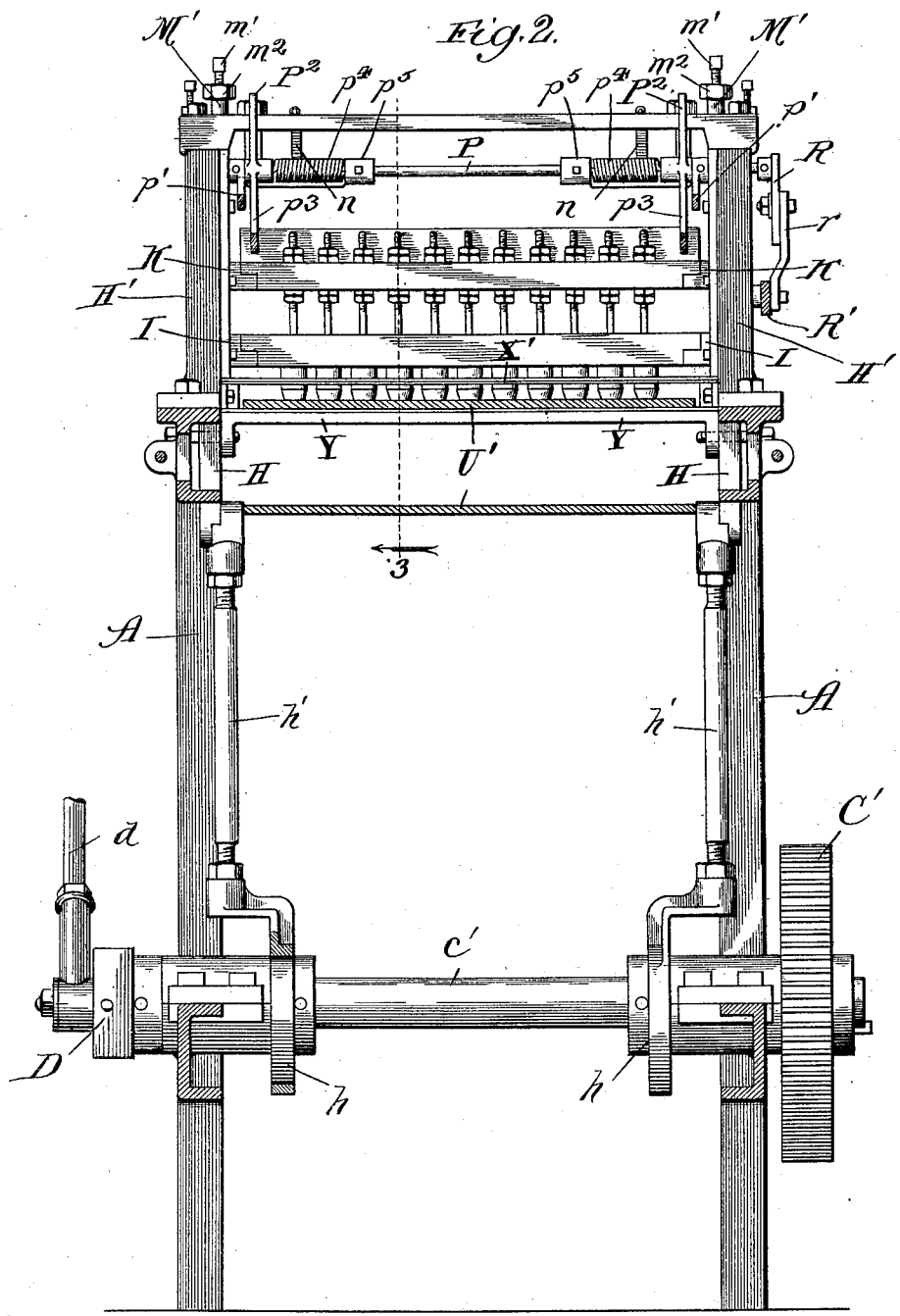

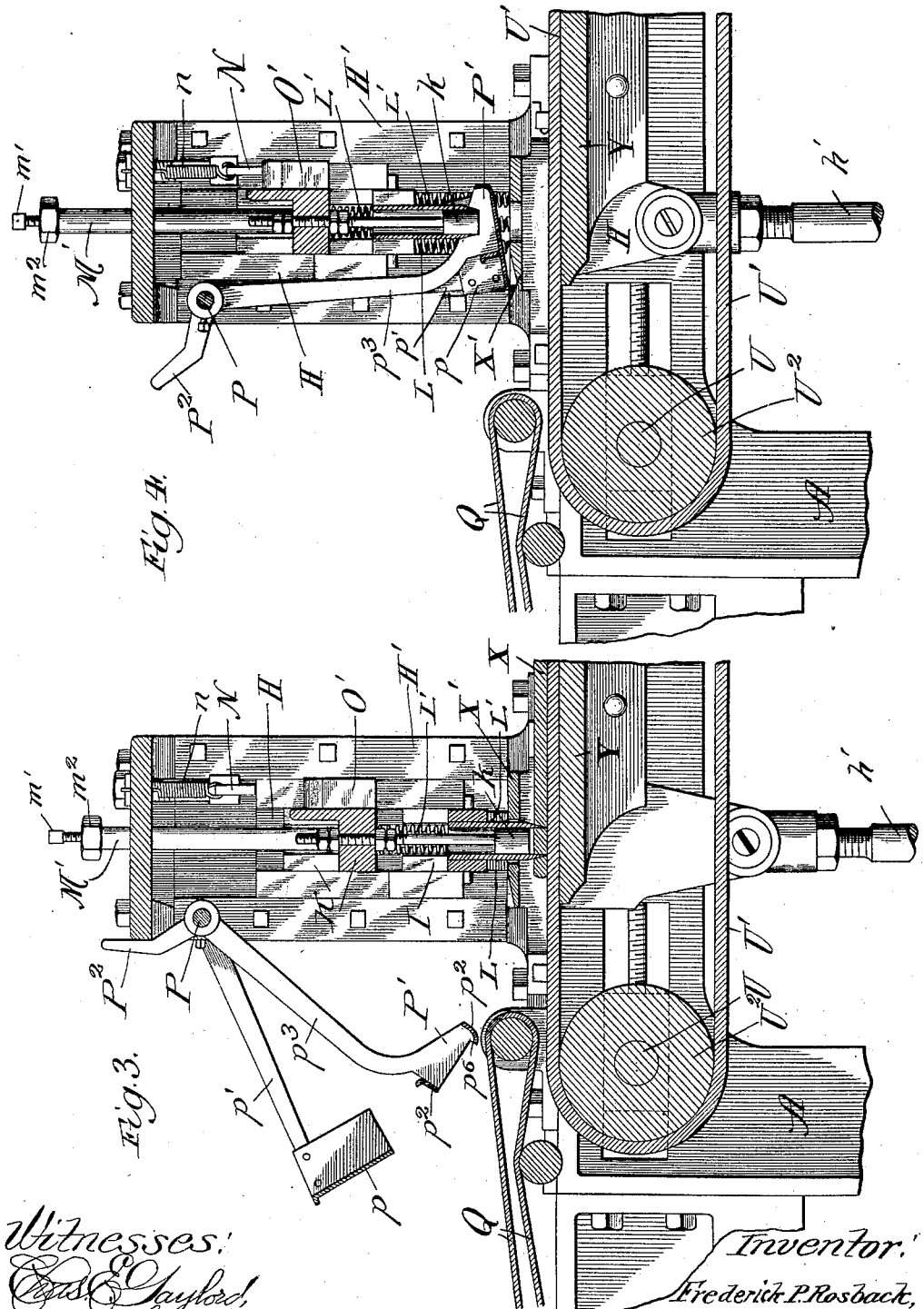

No. 660,461. Patented Oct. 23, 1900.
F. P. ROSBACK.
MACHINE FOR CUTTING LOZENGES.
(Application filed Dec. 5, 1898.)
(No Model.) 6 Sheets—Sheet 4.

Witnesses:

Inventor:
Frederick P. Rosback,
By Banning & Banning & Sheridan,
Att'ys

No. 660,461. Patented Oct. 23, 1900.
F. P. ROSBACK.
MACHINE FOR CUTTING LOZENGES.
(Application filed Dec. 5, 1898.)
(No Model.) 6 Sheets—Sheet 5.
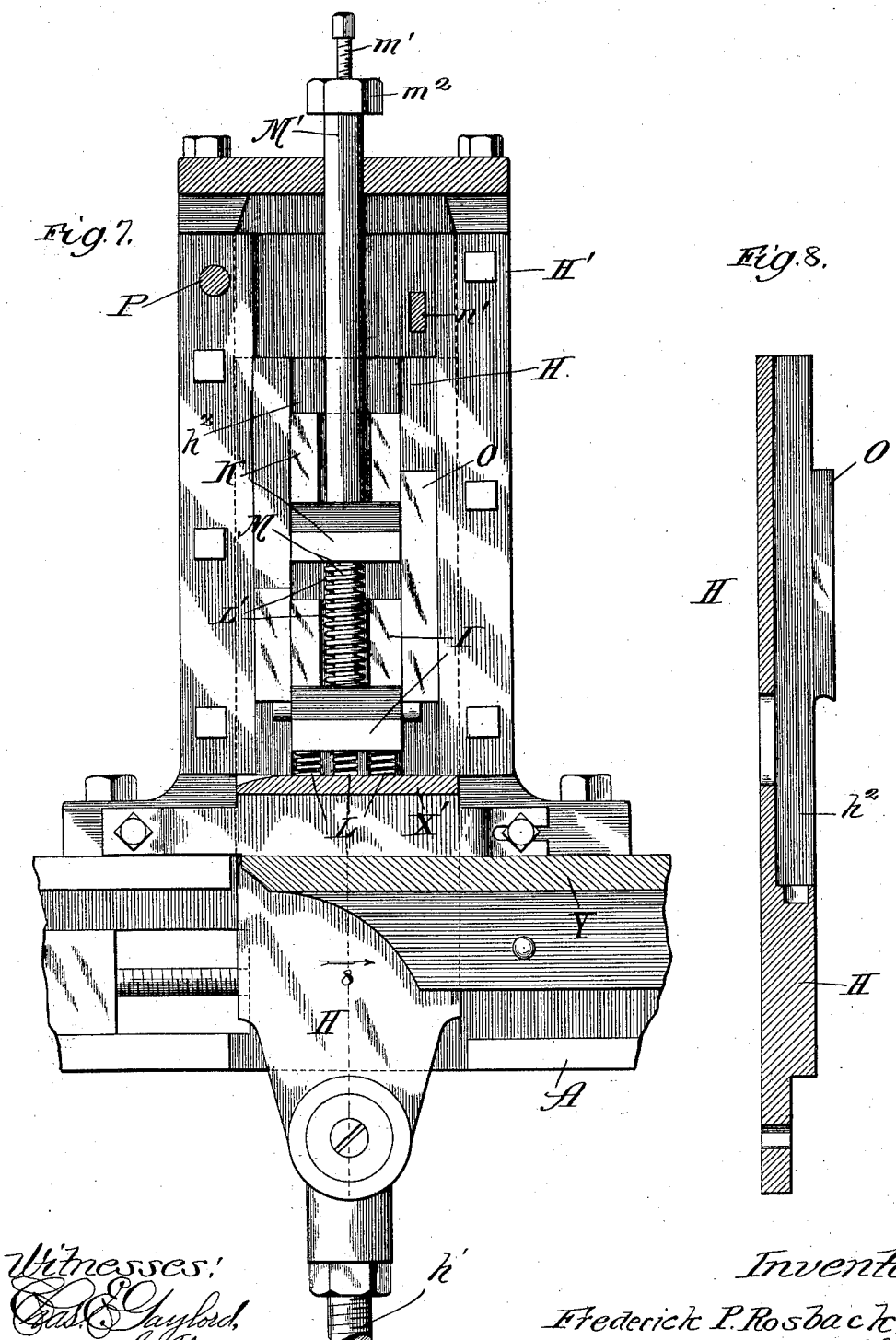
Witnesses:
Chas. E. Gaylord,
Luth. S. Alter.
Inventor:
Frederick P. Rosback,
By Banning & Banning & Sheridan,
Attys.
THE NORRIS PETERS CO., PHOTO-LITHO., WASHINGTON, D. C.

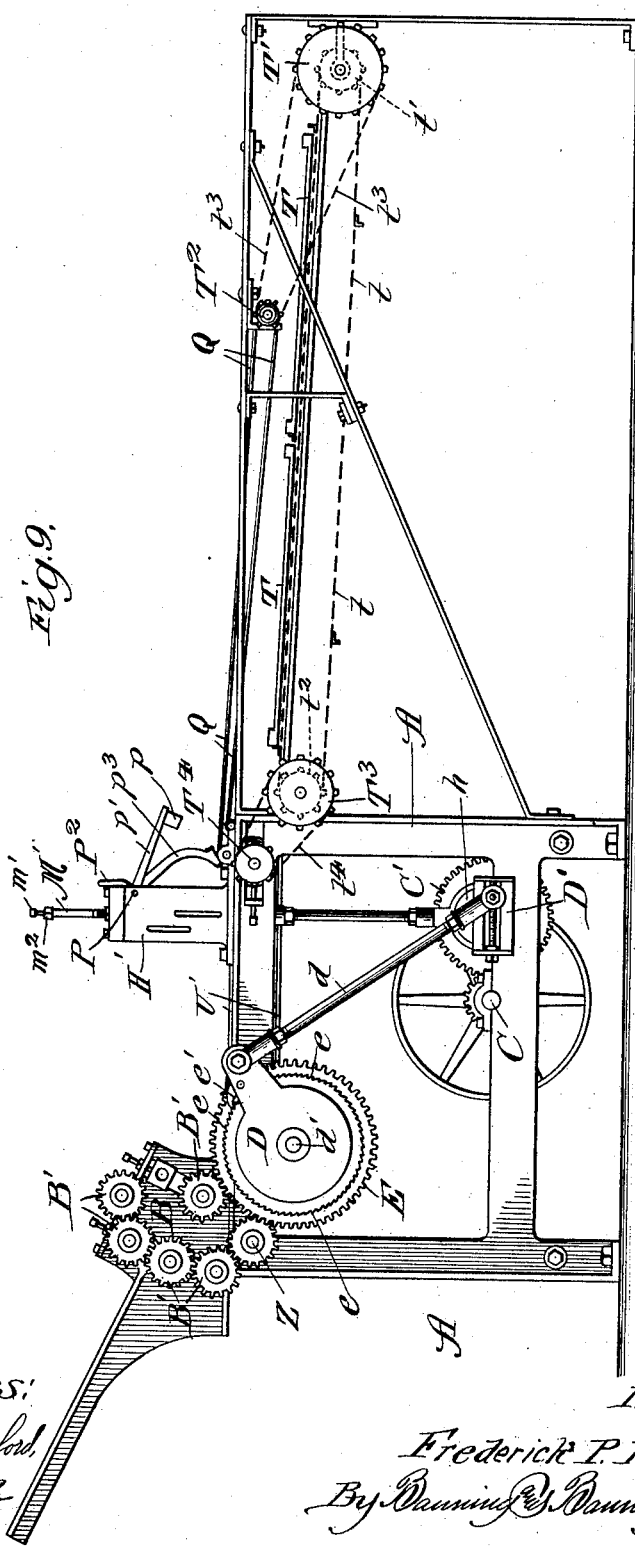

UNITED STATES PATENT OFFICE.

FREDERICK P. ROSBACK, OF CHICAGO, ILLINOIS, ASSIGNOR TO THE PAN CONFECTION COMPANY, OF ILLINOIS.

MACHINE FOR CUTTING LOZENGES.

SPECIFICATION forming part of Letters Patent No. 660,461, dated October 23, 1900.

Application filed December 5, 1898. Serial No. 698,340. (No model.)

*To all whom it may concern:*

Be it known that I, FREDERICK P. ROSBACK, a citizen of the United States, residing at Chicago, Cook county, Illinois, have invented certain new and useful Improvements in Machines for Cutting Lozenges, of which the following is a specification.

My invention relates to that class of machines which are automatic in their arrangement and are used for forming a loaf of candy-dough into sheets and cutting lozenges of various shapes and sizes therefrom, and particularly to the means for ejecting the cut lozenges from the punches and delivering them onto proper boards.

The object of the invention is to provide a simple, economical, and efficient machine for automatically forming and cutting lozenges from a sheet of candy-dough and discharging them upon a board or similar element; and the invention consists in the features, combinations, and details of construction hereinafter described and claimed.

Figure 1:
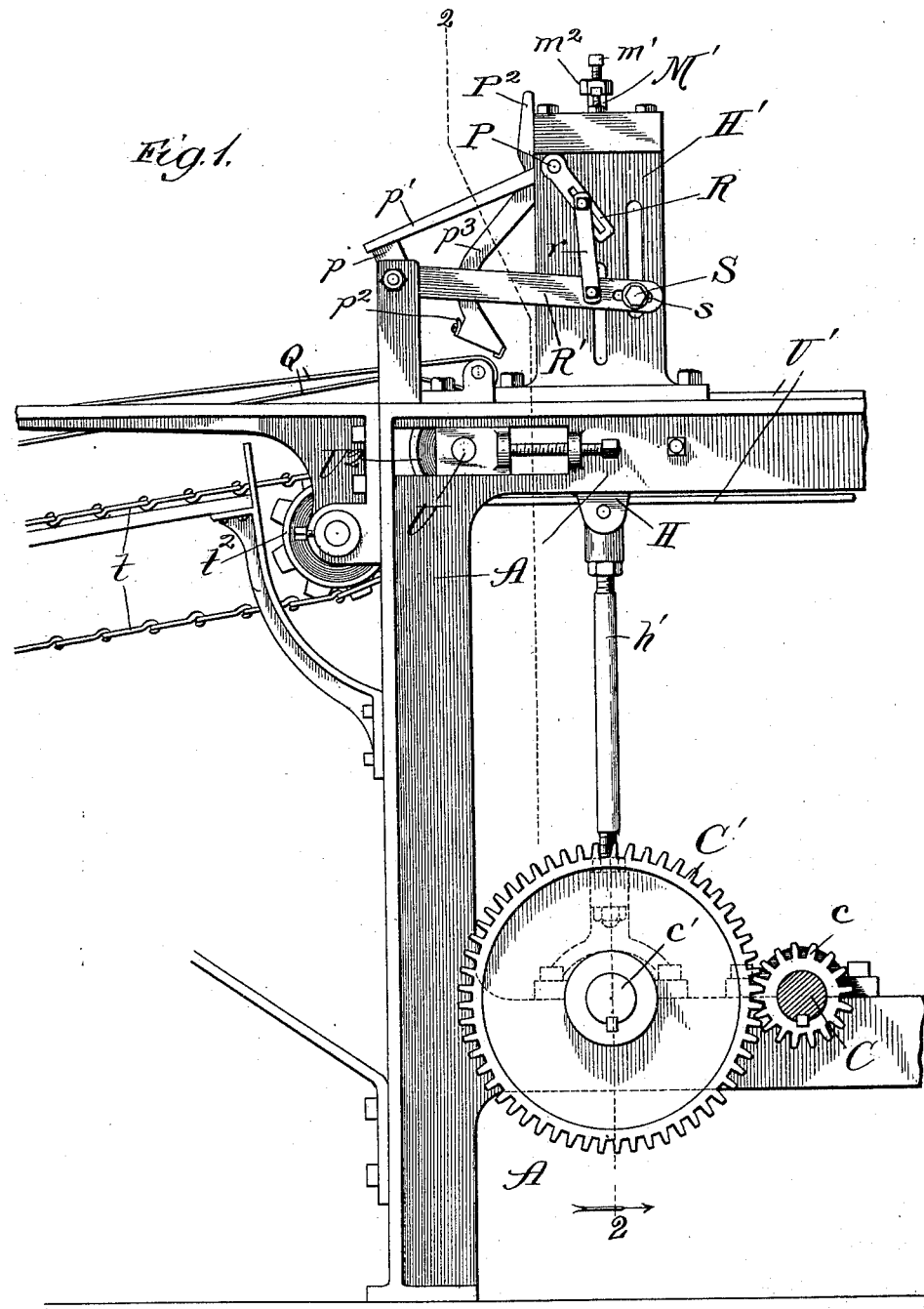
Figure 5:
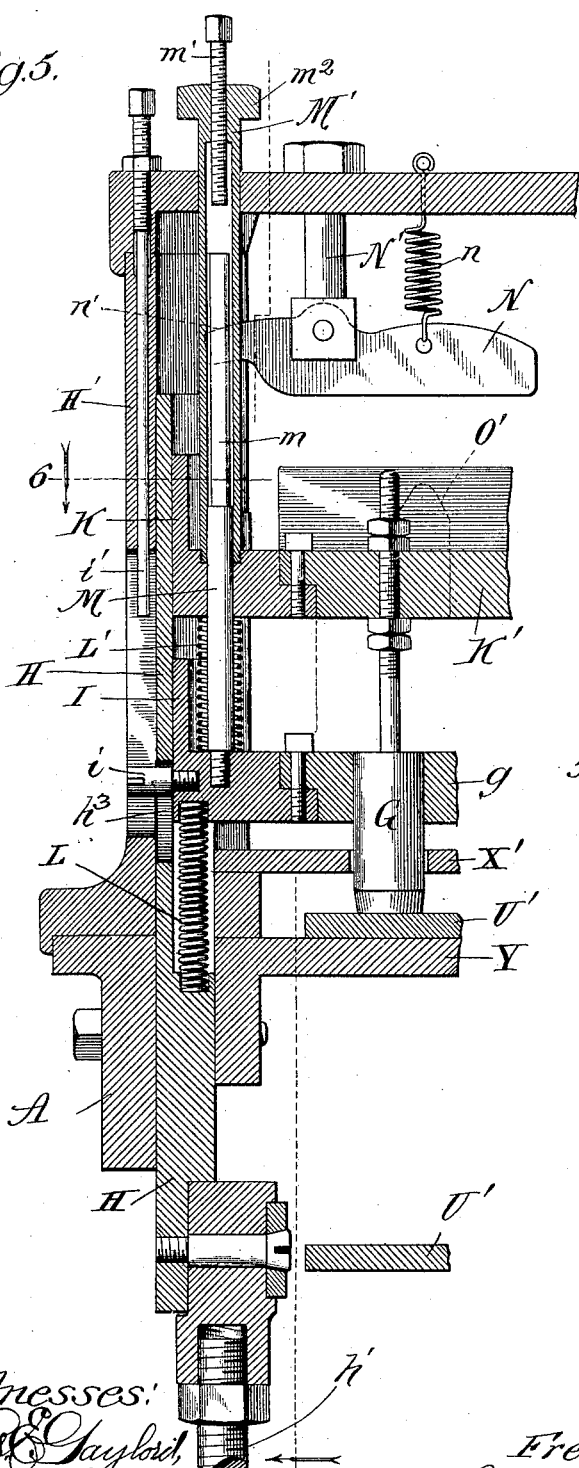
Figure 6:
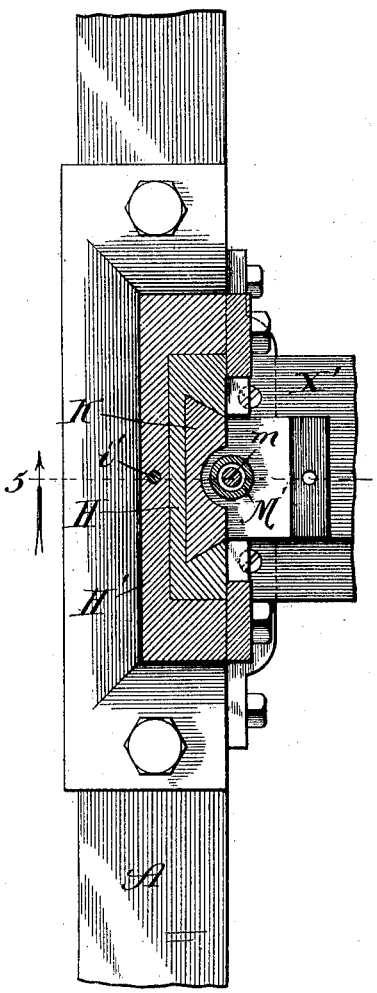

In the accompanying drawings, Figure 1 is a side elevation of a portion of the machine; Fig. 2, a vertical elevation taken on the irregular line 2 of Fig. 1; Figs. 3 and 4, side sectional views of a portion of the machine, taken on the line 3 of Fig. 2, showing the cutting and discharging mechanism in different positions; Fig. 5, an enlarged sectional elevation taken on the line 5 of Fig. 6; Fig. 6, a transverse sectional plan view taken on the line 6 of Fig. 5; Fig. 7, a side sectional view showing a portion of the mechanism and taken on line 7 of Fig. 5; Fig. 8, a sectional view of one of the slides, taken on the line 8 of Fig. 7; and Fig. 9, a side elevation of the complete machine.

In constructing a machine in accordance with my improvements I use a frame A of the desired size, shape, and strength to support and hold the operative parts in the desired position. This frame, as stated above, may be of any desired shape; but I prefer to make it in the shape of a rectangular open frame, as is shown in the drawings.

To reduce a loaf of dough into a sheet and feed it forward, several rolls are provided (not shown in detail) and mounted in the supplementary frame B. These rolls are provided with a train of gears B' for the purpose of giving the rolls the desired power and motion. To operate these rolls, a main driving-shaft C is provided and has a toothed pinion $c$, meshing with a gear C' on a supplementary shaft $c'$. This supplementary shaft is provided with a crank-plate D, having a cross-head slidingly mounted therein and which is provided with a connecting-rod $d$, engaging with an oscillating plate D', pivotally mounted on a second supplementary shaft $d'$. This supplementary shaft $d'$ is provided with a spur-gear E, to which is secured a ratchet $e$, with which a pawl $e'$, pivotally connected with the oscillating plate, may be engaged, the parts being so arranged and timed that the revolutions of the main shaft act, through the mechanism above described, to oscillate the plate and move the rolls forward in a step-by-step manner. During the movement of the rolls the candy-dough is forced between the same and is fed forward in the shape of a sheet, so that it comes under the cutting mechanism. (Shown particularly in Figs. 3 and 4.) For a fuller description as to the operation of the feeding-rolls, the sizing of the sheet of dough, &c., I would refer to my Patent No. 585,789, granted to me on the 6th day of July, A. D. 1897, in which such mechanism is fully described and claimed.

To cut and form the dough into lozenges, I provide a set of hollow punches G and mount them upon a cross-bar $g$, so that as the said punch cross-bar is moved up and down the punches are brought into contact with a piece of dough X to cut the same on the table Y. To move the cross-bar up and down, a pair of main slides H are slidingly mounted in the heads H' and are given their sliding or reciprocating motions by means of eccentrics $h$ and eccentric-rods $h'$. The eccentrics $h$ are mounted upon the supplementary shaft $c'$, from which they receive their power and motion. This punch cross-bar is secured to what I term "punch cross-bar slides" I, which are independently mounted in ways $h^2$ of the main slides, so that they may move with such slide simultaneously or independently, as may be desirable or necessary. When the main slides are having their upward stroke, it is necessary that these punch cross-bar slides be moved simultaneously with it for at least a portion of its stroke and be prevented from moving farther at the proper time. In order to accomplish this result, the punch cross-bar slides are provided with one or more studs $i$, which project out through openings $h^3$ into the main slide, so as to contact an adjustable pin $i'$, which extends through the head-blocks, as is particularly shown in Fig. 5. From this figure it will be seen that when the main slide is moved forward a larger part of its motion the adjustable pin contacts the screw-stud and holds the punch cross-bar slides from further upward movement, which also arrests the upward movement of the punches. As above suggested and as shown in Fig. 3, the punches when at their lower limit of motion have pierced the sheet of dough X and cut the lozenges, and the lozenges so cut will be carried upward by the punches on their upward motion, the stripper X' preventing the sheet of dough from being pulled up. It is necessary, therefore, that some means be provided to eject the cut lozenges at the proper time, and, as will more fully hereinafter appear, this ejecting process must be accomplished in a comparatively short space of time, so as to provide for ample time in which to remove the cut lozenges and discharge them at the proper place.

In order to eject the cut and formed lozenges from their punches, an ejector is provided, consisting of a set of ejecting-pistons $k$, one for each of the punches, as is particularly shown in Fig. 2, and each piston inserted within its hollow punch. This ejector is secured to a second cross-bar K', which I term the "ejector" cross-bar, and which is also secured, as is shown in Fig. 5, to two second supplementary slides K, which are independently and movably mounted in the main slide H, and which for convenience I term "ejector cross-bar slides." To move both of these supplementary and independently-movable punch and ejector cross-bar slides at the proper time, a primary set of springs L is inserted between the main slide and the punch cross-bar slides, as is shown particularly in Figs. 3, 4, and 5, while a second set of springs L' are inserted between the punch and ejector cross-bar slides, as is shown in the same figures. To secure the proper relation between these different sets of slides, an adjusting mechanism is provided, consisting of a stud M and loose pin $m$, a sleeve M', in which the stud and loose pin are inserted, and a set-screw $m'$ in the end of the sleeve. The stud has engagement with the punch cross-bar slides and is inserted through an opening in the ejector cross-bar slides and up into the cylinder. The sleeve has an engagement with the ejector cross-bar slides and extends upwardly through an opening in the frame of the machine, so that its head $m^2$ may contact the same. The springs above mentioned assist to keep the parts in their relative positions and to give all of such parts an upward movement during the upward stroke of the main slide. During the downward movement of the parts the main slide contacts set-screw $i$, so as to carry the punch-slides and cross-bar down with it and pierce the dough. The ejector cross-bar and its slides, with the ejector, are held back a desired amount, as shown in Fig. 3, by means of the coiled springs L'.

During the rising motion it is necessary to eject the lozenges in as short a time as possible and when the parts are at or near the upper limit of the upstroke. In order to accomplish this result, a pivotal lever N is provided and pivotally mounted in a stud N', while a coiled spring $n$ is used to hold the lever in its normal position. The main slide is provided with a block O, arranged in the path of the inner end $n'$ of the lever, while the outer free end of the lever is arranged so as to contact a projection O' on the ejector cross-bar slides. As the parts approach the upper limit of their stroke the projection O contacts the inner free end of the swinging lever and moves it up, while its outer free end contacts the ejector cross-bar slides and forces the same downwardly in an accelerated manner, so as to force the ejectors downwardly in the hollow punches and discharge the lozenges.

It is desirable that some means be provided to limit the downward movement of the ejector or to move the ejector and punches down simultaneously, so that the ejecting-pistons will not pass the lower end of the punches to come in contact with the punch ends and dull the cutting edges of the same. In order to accomplish this result, the stud M, sleeve M', loose pin $m$, and set-screw $m'$, above described, are provided. During the downward movement of the ejector-slide the sleeve M' is carried with it, so that as it approaches its desired limit the set-screw $m'$ contacts the loose pin $m$, which in turn impinges against the stud M and carries the punch cross-bar slides and cross-bar with it during the remaining part of its motion.

It is necessary that means be provided for catching the ejected lozenges and discharging them on a proper delivery mechanism. In order to provide suitable mechanism for this purpose, a rock-shaft P is provided, upon which is mounted what I term a "dumping-plate" $p$, so arranged that it may be brought under the punches, as shown in Fig. 4, for the purpose of receiving the discharged lozenges, or tilted into the position shown in Fig. 3 for the purpose of dumping the cut lozenges onto a delivery-belt Q.

To assist in dumping the lozenges upon the discharging-belt, a scraper P' is provided, which is formed of ends and sides $p^2$, but has no bottom portion. This scraper is loosely mounted upon the rock-shaft by means of the arms $p^3$, so that when the rock-shaft is oscillated to near the limit of its motion the parts are in their closed position, as shown in Fig. 4, and when the rock-shaft is moving to the other limit of its motion the parts are in their open or dumping position, as shown in Fig. 3.

To give the dumping mechanism its necessary movements, the rock-shaft is provided with a slotted arm R, connected with a pivoted operating-lever R' by means of the link r. This operating-lever is connected with the main slide by means of a screw S, which extends through a slot s in the operating-lever. The arms of the scraper, as above stated, are loosely mounted on the rock-shaft, and in order to assist in giving them their movements a pair of helically-coiled springs $p^4$ are provided, which have one end engaging with collars $p^5$ on the rock-shaft and the other end engaging with the arms of the scraper. The arms of the scraper have also oppositely-projecting ends $P^2$, adapted to contact the frame of the machine.

The operation of the dumping apparatus is as follows: When the main slide is moved upwardly, the operating-lever is also moved upwardly and the crank-shaft is oscillated in the direction to bring the dumping mechanism in a closed condition under the punches to receive the ejected lozenges, as shown in Fig. 4. During the downward movement of the main slide the rock-shaft, by means of the operating-lever, is oscillated in the reverse direction, the helically-coiled springs move the scraper back simultaneously with the dumping-plate, and continue such movement until the arms $P^2$ contact the frame of the machine, when the further movement of the scraper is arrested. The continuing movement separates the parts, so that the heel of the scraper strikes the lozenges while the dumping-plate is in an inclined position, thus assisting in discharging the lozenges onto the delivery-belt. During the forward movement of the dumping-plate it contacts a lug $p^6$ on the scraper and carries such scraper forward with it in a closed manner, as shown in Fig. 4. The lozenges on the delivery-belt Q, by means of the movement of such belt, are carried forward until they fall over and are delivered on the boards T, (shown in Fig. 9,) the boards being moved forward step by step by means of the chain t, which is passed around suitable sprockets $t'$ and $t^2$ and which are given their movement by means of the sprockets T', $T^2$, $T^3$, and $T^4$, the sprocket-belts $t^3$ and $t^4$, which in turn are operated by means of the shaft U and belt U', which passes around the drum $U^2$, such drum being driven by the belt U' and the drum (not shown) on the shaft Z.

I claim—

1. In a machine of the class described, the combination of a set of hollow punches to cut and form lozenges, a cross-bar upon which such punches are mounted, a pair of slides for such cross-bar, an ejector formed of an ejecting-piston in each punch, a cross-bar for supporting and moving the ejector, a pair of slides for such ejector cross-bar, a pair of main slides in which the punch and ejector cross-bar slides are independently and movably mounted, and means for moving such slides simultaneously and independently, substantially as described.

2. In a machine of the class described, the combination of a set of hollow punches to cut and form lozenges, a cross-bar upon which such punches are mounted, a pair of slides for such cross-bar, an ejector formed of an ejecting piston in each punch, a cross-bar for supporting and moving the ejector, a pair of slides for such ejector cross-bar, a pair of main slides in which the punch and ejector cross-bar slides are independently and movably mounted, means for giving the slides upward and downward movements, and means for giving the ejector cross-bar slides an independent and accelerated downward movement to move the ejector and discharge the lozenges, substantially as described.

3. In a machine of the class described, the combination of a set of hollow punches to cut and form lozenges, a cross-bar upon which such punches are mounted, a pair of slides for such cross-bar, an ejector formed of an ejecting-piston in each punch, a cross-bar for supporting and moving the ejector, a pair of slides for such ejector cross-bar, a pair of main slides in which the punch and ejector cross-bar slides are independently and movably mounted, springs for holding the independent cross-bar slides in their normal positions, means for moving the main slides upwardly and downwardly, means for limiting the upward movement of the punch cross-bar slides, and means for giving the ejector cross-bar slides an independent downward movement to discharge the cut lozenges, substantially as described.

4. In a machine of the class described, the combination of a set of hollow punches to cut and form lozenges, a cross-bar upon which such punches are mounted, a pair of slides for such cross-bar, an ejector formed of an ejecting-piston in each punch, a cross-bar for supporting and moving the ejector, a pair of slides for such ejector cross-bar, a pair of main slides in which the punch and ejector cross-bar slides are independently and movably mounted, means for giving the main slides an upward-and-downward movement, means for adjusting the relation of the independent cross-bar slides, means for limiting the upward movement of the punch cross-bar slides, and lever mechanism arranged to be contacted by the main slide and strike the ejector cross-bar slides and give the ejector cross-bar slides an independent downward movement to eject the cut lozenges, substantially as described.

5. In a machine of the class described, the combination of a set of hollow punches to cut and form lozenges, a cross-bar upon which such punches are mounted, a pair of slides for such cross-bar, an ejector formed of an ejecting-piston in each punch, a cross-bar for supporting and moving the ejector, a pair of slides for such ejector cross-bar, a pair of main slides in which the punch and ejector cross-bar slides are independently and movably mounted, means for moving the main slides upwardly and downwardly, spring mechanism located between the independent slides and the main slides to hold the independent slides in their normal positions, stop mechanism to limit the upward movement of the punch cross-bar slides, adjusting mechanism for regulating the position of the cross-bar slides with each other, and means for giving the ejector cross-bar slides an independent accelerated downward movement when the main slide is at or near the upper limit of its motion consisting of a lever arranged to be contacted by the main slide or slides and to strike the ejector and cross-bar slide or slides, substantially as described.

6. In a machine of the class described, the combination of means for feeding and cutting lozenges, means for catching and dumping the cut lozenges which consists of a tilting plate and hollow box-like scraper, and means for holding such parts in a closed box-like condition to receive the cut lozenges, and means for moving and separating the same to discharge the lozenges, substantially as described.

7. In a machine of the class described, the combination of means for cutting and forming lozenges, means for catching and dumping the cut lozenges consisting of a rock-shaft, a tilting dumping-plate connected therewith, a hollow box-like scraper mounted on such shaft and means for moving such parts in a closed condition under the cutting mechanism to receive the cut lozenge, and means for moving such mechanism away from the catching-point, separating the same and discharging the lozenge, substantially as described.

8. In a machine of the class described, the combination of means for cutting and forming lozenges, and dumping mechanism consisting of a rock-shaft, a dumping-plate connected with such rock-shaft and adapted to be brought under the cutting mechanism to receive the discharged lozenge, a hollow box-like scraper loosely mounted on the rock-shaft and adapted to be moved in one direction by the tilting plate, spring mechanism to move the scraper in the opposite direction, means for limiting the movement of the scraper in the discharging direction so arranged that the dumping mechanism is brought under the cutting mechanism in a closed condition and separated as it moves from such position, substantially as described.

9. In a machine of the class described, the combination of a pair of main slides, means for giving such slides an upward-and-downward movement, cutting and discharging mechanism mounted in such slides for cutting and forming lozenges, mechanism for receiving and dumping cut lozenges as they are ejected consisting of a rock-shaft, means connecting such rock-shaft with the vertical movable slides, a dumping-plate mounted on such rock-shaft and arranged to be brought under the cutting mechanism and be moved away from such cutting mechanism, a box-like scraper loosely mounted on the rock-shaft and adapted to be moved forward by the dumping-plate and form in connection therewith a receiving-box to receive the cut and discharged lozenges, springs connected with the scraper mechanism and with the rock-shaft to move the scrapers in the opposite manner and means for limiting the backward-discharging movement of the scraper so as to separate it from the dumping-plate and discharge the cut lozenge, substantially as described.

FREDERICK P. ROSBACK.

Witnesses:
 THOMAS B. MCGREGOR,
 THOMAS F. SHERIDAN.